(12) United States Patent
Zinser

(10) Patent No.: US 9,923,346 B2
(45) Date of Patent: *Mar. 20, 2018

(54) PLIERS

(71) Applicant: WEZAG GmbH Werkzeugfabrik, Stadtallendorf (DE)

(72) Inventor: Roman Zinser, Neustadt (DE)

(73) Assignee: WEZAG GMBH WERKZEUGFABRIK, Stadtallendorf (DE)

( * ) Notice: Subject to any disclaimer, the term of this patent is extended or adjusted under 35 U.S.C. 154(b) by 245 days.

This patent is subject to a terminal disclaimer.

(21) Appl. No.: 14/804,540

(22) Filed: Jul. 21, 2015

(65) Prior Publication Data

US 2016/0016302 A1    Jan. 21, 2016

(30) Foreign Application Priority Data

Jul. 21, 2014  (EP) .................................. 14177831

(51) Int. Cl.
*B25G 1/08* (2006.01)
*H02G 1/12* (2006.01)
*B25B 7/04* (2006.01)

(52) U.S. Cl.
CPC ............. *H02G 1/1212* (2013.01); *B25B 7/04* (2013.01); *B25G 1/085* (2013.01); *H02G 1/1236* (2013.01)

(58) Field of Classification Search
CPC ...... H02G 1/1212; H02G 1/1236; B25B 7/04; B25G 1/085

(Continued)

(56) References Cited

U.S. PATENT DOCUMENTS 5,280,659 A    1/1994  Park
5,724,871 A *  3/1998  Wall ..................... H02G 1/1212
                                                    81/9.43

(Continued)

FOREIGN PATENT DOCUMENTS

DE    93000908.9    6/1993
DE    29613051      10/1996

(Continued)

*Primary Examiner* — Hadi Shakeri
(74) *Attorney, Agent, or Firm* — Thomas | Horstemeyer LLP

(57) ABSTRACT

The invention relates to a stripping tool (1) comprising at least one stripping jaw. A cutting element (10, 11) is exchangeably assembled with the stripping jaw under use of a mounting groove (56, 57). Preferably, mounting and dismounting is performed along mounting axes (58, 59) having an orientation perpendicular to a pivot plane of the pliers jaws (3, 4). The inventive stripping tool (1) comprises an exchange position in which the mounting and dismounting of the cutting elements (10, 11) is possible, in particular through a cutaway (62, 63) of a side wall (64, 65) of the pliers jaws (3, 4). If the exchange position is left a movement of the cutting element (10, 11) is blocked by a securing element (66) formed by the side wall (64, 65) so that a securing of the position of the cutting element (10, 11) is provided. In the exchange position it is easy to disassemble the cutting element (10, 11) and to assemble a new cutting element wherein no additional measures (as the release of a screwed connection, a dismounting of the stripping unit and the like) are required for disassembly.

19 Claims, 13 Drawing Sheets

(58) Field of Classification Search
USPC .......................................... 81/9.4, 177.4, 490
See application file for complete search history.

(56) References Cited

U.S. PATENT DOCUMENTS

| | | | |
|---|---|---|---|
| 5,735,005 A | 4/1998 | Wang | |
| 6,023,805 A * | 2/2000 | Lin | B25F 1/003 |
| | | | 7/118 |
| 6,877,186 B2 * | 4/2005 | Shiao | B25G 1/005 |
| | | | 16/111.1 |
| 6,910,401 B2 * | 6/2005 | Tapper | H02G 1/1212 |
| | | | 30/90.1 |
| 7,134,368 B2 * | 11/2006 | Nagy | B25G 1/085 |
| | | | 81/177.4 |
| 7,900,537 B2 * | 3/2011 | Hanning | H02G 1/1241 |
| | | | 30/91.1 |
| 7,997,170 B1 * | 8/2011 | Martinez | B25B 7/00 |
| | | | 7/128 |
| 2010/0101379 A1 | 4/2010 | Hofmann et al. | |
| 2013/0097786 A1 | 4/2013 | Hardinge et al. | |

FOREIGN PATENT DOCUMENTS

| | | |
|---|---|---|
| DE | 20100031 | 6/2002 |
| WO | WO2008116787 | 2/2008 |

* cited by examiner

PLIERS

CROSS REFERENCE TO RELATED APPLICATIONS

The application claims priority to co-pending German Patent Application No. EP 14177831.6 filed Jul. 21, 2014.

FIELD OF THE INVENTION

The present invention relates to pliers, in particular stripping pliers. A pliers part of the pliers comprises a storage unit in which it is possible to store an accessory part (in particular a cutting element, a clamping element and/or a crimping element of the pliers).

BACKGROUND OF THE INVENTION

Pliers can be built with accessory parts, in particular exchange parts. An accessory part of this type might e.g. be exchangeable cutting elements as cutting knifes, exchangeable clamping elements as clamping jaws and/or exchangeable crimping elements as crimping dies. An exchange of an accessory part of this type might be required due to wear and/or might be required in order to process work pieces of different geometries and types with the pliers. It is e.g. possible that different crimping dies, clamping jaws or cutting knifes are used which have cutting edges, die surfaces or clamping surfaces with differing contours. A problem might be the storing of the accessory parts. In the simplest case the user carries the accessory parts loosely around or the user stores the accessory parts in a tool box.

The publication WO 2008/116787 A1 (corresponding to US 2010/0101379 A1) discloses a magazine for accessory parts being built by crimping die halves. The magazine is drum-shaped with a plurality of accommodating chambers located at locations distributed in circumferential direction. In each of the accommodating chambers a pair of crimping die halves is stored. In a state in which the crimping die halves are assembled on the crimping pliers the crimping die halves are introduced into the accommodating chamber of the magazine. This is done by introducing the front surface of the crimping pliers (where the crimping die halves are located) into the accommodating chamber. The crimping die halves each comprise snap lugs located in an end region being freely accessible from the front side. The snap lugs can be latched with spring biased latching hooks of the magazine. If a pair of crimping die halves is latched with the magazine in this way, it is possible to withdraw the crimping pliers from the magazine. With the withdrawal of the crimping pliers from the magazine the crimping die halves remain in the magazine which is due to the latching with the latching hooks. Accordingly, the crimping die halves are held in the magazine for their storage. However, it is required that the crimping die halves are connected with the pliers head by a suitable coupling. The couplings (without any additional securing during the withdrawal of the crimping pliers from the magazine) have to provide a sliding disassembling movement of the crimping die halves with respect to the pliers head. Subsequent to a removal of a formerly used couple of crimping die halves as explained from the magazine it is possible to introduce the crimping pliers (now not being equipped with crimping die halves) into another accommodating chamber of the magazine for a coupling with another couple of crimping die halves located in this accommodating chamber. The coupling is again provided by a sliding movement between the crimping pliers and the crimping die halves. A release of the crimping die halves from this accommodating chamber is provided by a manually caused release of the latching hook of the magazine from the snap lugs of the crimping die halves. The magazine according to WO 2008/116787 A1 is formed separately from the crimping pliers.

The publication DE 201 00 031 U1 proposes a storage of accessory parts built by crimping die halves directly at hand levers of crimping pliers. For this purpose, the two hand levers have guiding grooves on their sides facing towards each other and extending from the end regions of the hand levers. It is possible to introduce two crimping die halves one behind the other into each of the guiding grooves. The position of the crimping die halves within the guiding grooves is secured by latching spheres which extend into the guiding groove under the bias of a spring. At their bottom sides the crimping die halves each comprise a latching recess into which in the secured position of the crimping die halves the latching spheres engage. Pliers jaws of the crimping pliers have corresponding guiding grooves into which a couple of crimping die halves used for crimping is slit from the front surface of the crimping jaws in a mounting direction having an orientation radial to the pivot axis of the crimping jaws. In the operating state the crimping die halves are also secured at the pliers jaws by spring-biased latching spheres.

The publication US 2013/0097786 A1 building the closest prior art discloses multifunctional pliers used for crimping, stripping and cutting of cables. The pliers comprise a holding unit for screwdriver inserts (so-called "bits") as well as a for a cutting knife. Whereas the holding unit for the screw driver inserts is pivotally held at a hand lever of the multifunctional pliers, the other hand lever comprises a base body. The base body comprises a U-shaped cross-section which is open towards the aforementioned hand lever. A lid is pivotably held at the base body in an end region facing away from the pliers head. The lid comprises recesses in the type of blind holes. If the lid is closed, these recesses open into the interior chamber of the hand lever, wherein the interior chamber is defined by the base body and the lid. It is possible to insert or plug screwdriver inserts into these recesses. The screwdriver inserts are held in the recesses by friction or by magnetic forces. Held in this way the screwdriver inserts are stored in the inner chamber of the hand lever.

Further prior art is known from DE 93 00 908 U1, DE 296 13 051 U1 and U.S. Pat. No. 7,334,502 B1.

SUMMARY OF THE INVENTION

The present invention proposes pliers. Here, pliers might be any tool, wherein manual actuating forces are produced by two hand levers under a pivoting movement of the hand levers relative to each other and wherein by actuation by the hand levers (if applicable geared-up or geared-down by a transmission) a workpiece is processed with the pliers. The pliers parts are in particular designated for cable stripping pliers.

According to the invention, a pliers part is formed with at least two pieces, namely a base body and a lid. The base body might be built with one part or a plurality of parts. The base body comprises an open cross-section. It is possible to at least partially close the open cross-section by the lid which is built by one part or a plurality of parts. The lid and the open cross-section of the base body together limit an inner chamber of the pliers part. It is possible to locate at least one accessory part in this inner chamber. It is possible that the accessory part is loosely located in the inner chamber or that the accessory part is fixed in the inner chamber. By means of the lid it is possible to provide that the accessory part cannot be lost from the inner chamber of the pliers part. It is also possible that the inner chamber is at least partially sealed by the lid so that the inner chamber and the accessory parts located therein are protected against contaminations and/or damages. It is also possible that the lid provides an optically appealing closure of the inner chamber and contributes to the design of the outer surface of the pliers part. By the choice of the outer shape of the lid and the base body it is (despite of the storage of the accessory part in the inner chamber of the pliers part) possible to provide an outer contour which is comfortable for the hand of the user. This is in particular of interest if the pliers part is built by a hand lever.

It is possible that the accessory part comprises separate holding means, in particular a protrusion, a recess, a pin or bolt or a latching or locking element by which the accessory part is held in the inner chamber of the pliers part. However, according to the invention the accessory part (built by an exchangeable cutting element, clamping element or crimping element) is held in the inner chamber for storage in the pliers part by one and the same holding mechanism also used for holding the accessory part in its operating state at the pliers head. Accordingly, there is no need for equipping the accessory part with different holding mechanisms on the one hand for the fixation of the accessory part in the operating state at the pliers head and on the other hand for providing the holding effect for the storage in the pliers part.

For one embodiment of the invention, the pliers part comprising the storage unit is built by the pliers head. In this case it is also possible that the pliers part wherein the storage unit is integrated is built by a pliers jaw.

For another embodiment, the pliers part is built by a hand lever.

In the case that it is not intended to store the accessory part loosely within the inner chamber, it is e.g. possible to hold the accessory part at the base body of the pliers part. This might e.g. be provided by latching of the accessory part with the base body, by screwing the accessory part with the base body or by inserting the accessory part into a mounting groove formed by the base body.

However, according to one embodiment of the invention the accessory part is held at the lid. This embodiment leads to the advantage that the accessory part is easily accessible when swinging the lid into its open position or when disassembling the lid. It is even possible that a plurality of lids is associated with the pliers, wherein the lids are exchangeable and wherein different accessory parts are held at the exchangeable lids. Accordingly, the user is able to equip the pliers with a lid with accessory parts being suitable for the upcoming use, whereas other accessory parts (which are not of interest at present) might be stored at another lid which might e.g. be put into a tool box.

For the attachment and bearing of the lid at the base body of the pliers part there are a lot of different options. To name only some non-limiting examples, the lid might be screwed, riveted or clipped with the base body, slit into the base body and the like. For one inventive embodiment, the lid is pivotably linked with the base body of the pliers part. In this case, the lid might be brought into a closed position, wherein the lid at least partially closes the base body of the pliers part, and into an open position in which the lid has been pivoted away from the base body of the pliers part and which provides the option to remove or introduce accessory parts from and into the lid or the base body of the pliers part.

For one embodiment of the pliers part, in the closed position the lid is latched or locked with the base body.

There are a lot of options for the design of the holding mechanism between the accessory part and the base body or the lid. According to one proposal of the invention, the accessory part is held at the pliers part by a dovetail joint. Here, the base body or the lid forms a mounting groove or a mounting element of the dovetail joint. The dovetail joint between the accessory part and the lid or the base body is assembled along a mounting axis which has an orientation vertical to a pivot plane of the hand levers and/or pliers jaws of the pliers. Here, the feature "dovetail joint" also covers contours of the mounting element and the mounting groove which do not have the exact form of a "dovetail" but provide a positive-locking engagement under the formation of at least one suitable undercut. The inventive positive-locking connection by a kind of dovetail joint with the positive-locking engagement of a mounting element into a mounting groove on the one hand provides a simplified introduction along the mounting axis defined by the mounting groove. On the other hand, the positive-locking engagement provides an exact definition of the orientation of the accessory part relative to the lid or the base body of the pliers part. In the case that the same dovetail joint is used for holding the accessory part in the operating state at the pliers head, the dovetail joint provides a good accommodation and transfer of forces between the pliers head and the accessory part.

There are a lot of options for securing the accessory part with respect to the lid or the base body when using a dovetail joint. If applicable, the friction between the mounting groove and the mounting element might be sufficient for securing. It is also possible that a latching or locking unit is used for securing. For a particular suggestion according to the invention, the accessory part is held at the lid of the pliers part. Here, the accessory part builds the mounting element of the dovetail joint, whereas the lid forms the mounting groove of the dovetail joint. In the closed position of the lid, the exit of the mounting element of the accessory part from the mounting groove of the lid is blocked by an inner wall of the base body limiting the inner chamber. This embodiment builds a very simple but reliable securing of the position of the accessory part in the mounting groove of the lid.

There are also a lot of options for arranging the lid at a hand lever which for one embodiment builds the pliers part according to the invention. It is possible that the lid closes a front surface of the hand lever facing away from the head of the pliers. The lid might comprise an enlarged surface area (and might provide the option to store an increased number of accessory parts) if the lid is located in the region of a longitudinal surface of the hand lever. If the lid is e.g. located on a side of the hand lever which in assembled state faces away from the other hand lever, it is possible to freely remove the lid from the hand lever or pivot the lid in outer direction, wherein the movement is not limited or blocked by the other hand lever. The corresponding applies if the lid is assembled on a side of the hand lever having a normal vector with an orientation vertical to the pivot plane of the hand levers.

However, according to one embodiment of the invention, the lid is located on the side of the base body which faces towards the other hand lever in the assembled state of the hand levers. This embodiment in particular bases on the finding that this side of the hand lever is not biased by the hand of the user during the application of hand forces upon the two hand levers. Accordingly, the lid is not biased by hand forces. On the other hand, the demands concerning the contour shape of the lid for provided good haptics of the stripping tool might be at least reduced for this type of arrangement of the lid. In some cases, this embodiment of the invention also uses the finding that a sufficient intermediate space remains between the hand levers for spread hand levers in order to assemble and disassemble the lid or pivot the lid in opening or closing direction.

The accessory part might be assembled with the hand lever along any mounting axis (e.g. along the longitudinal axis of the hand lever with the insertion of the accessory part into a mounting groove). For one embodiment, the accessory part is assembled or disassembled along a mounting axis having an orientation transverse to the longitudinal axis of the hand lever. A mounting process along a mounting axis with this orientation is very simple which is in particular due to the fact that the mounting process is not blocked by the other hand lever. A disadvantage of the embodiment according to publication of DE 201 00 031 U1 is that here it is necessary to successively introduce the crimping die halves into the guiding groove of the hand lever. In the case that a crimping die half is required which has at first been introduced into the guiding groove, there is the need to first remove the crimping die half subsequently introduced into the guiding groove from the hand lever before being able to slide the required crimping die half out of the guiding groove. With the inventive mounting process and dismounting process of the accessory part along the mounting axis having an orientation transverse to the longitudinal axis of the hand lever it is e.g. possible to locate a plurality of holding mechanisms for the accessory part (in particular mounting grooves) one besides the other at the hand lever. In this case it is possible to selectively remove accessory parts each held by a holding mechanism or in a mounting groove selectively along the mounting axis without the need to remove other accessory parts.

For one embodiment, the lid is pivotably supported at the base body in its end region facing towards the pliers head. This embodiment uses the fact that the two hand levers assembled to the pliers comprise an open position with a free intermediate space having approximately the shape of a segment of a circle. When linking the lid with the end region facing towards the pliers head at the base body, also the lid might be brought into an open state with respect to the base body in which the lid and the base body are arranged similar as a segment of a circle. Here, the two segments of a circle (on the one hand built between the hand lever and on the other hand built between the lid and the base body) are lying within each other in a way that for a given opening angle of the hand levers a maximum of the opening angle of the lid with respect to the base body results.

According to the invention, it is possible that the pliers part is used for pliers.

Furthermore, the invention suggests cable stripping pliers wherein a pliers part of the above described type is used. The stripping pliers comprise a stripping unit. During a cutting stroke it is possible to change an operating state of the stripping unit in a pivot plane under the actuation of a drive built with the hand levers. Furthermore, in a stripping stroke the stripping unit is moveable by the drive along a stripping axis. A cutting element building the accessory part is exchangeably mounted with the stripping unit. Here, the mounting of the cutting element with the stripping unit is done under use of a mounting groove wherein a mounting element is slid into the mounting groove under the build-up of a positive lock. For one embodiment, the stripping unit comprises the mounting groove, whereas the mounting element is provided on the cutting element. Accordingly, a dovetail joint between the cutting element and the stripping unit built with the mounting element and the mounting groove is used. The base body and the lid of the pliers part comprise a mounting element or a mounting groove which is formed correspondent to the mounting element or the mounting groove of the stripping unit. Under use of its mounting element or mounting groove the cutting element is also held at the mounting element or mounting groove of the lid or the base body under the build-up of a dovetail joint in the inner chamber of the pliers part.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element like for example a cutting element, a cable stripping jaw or a mounting groove is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
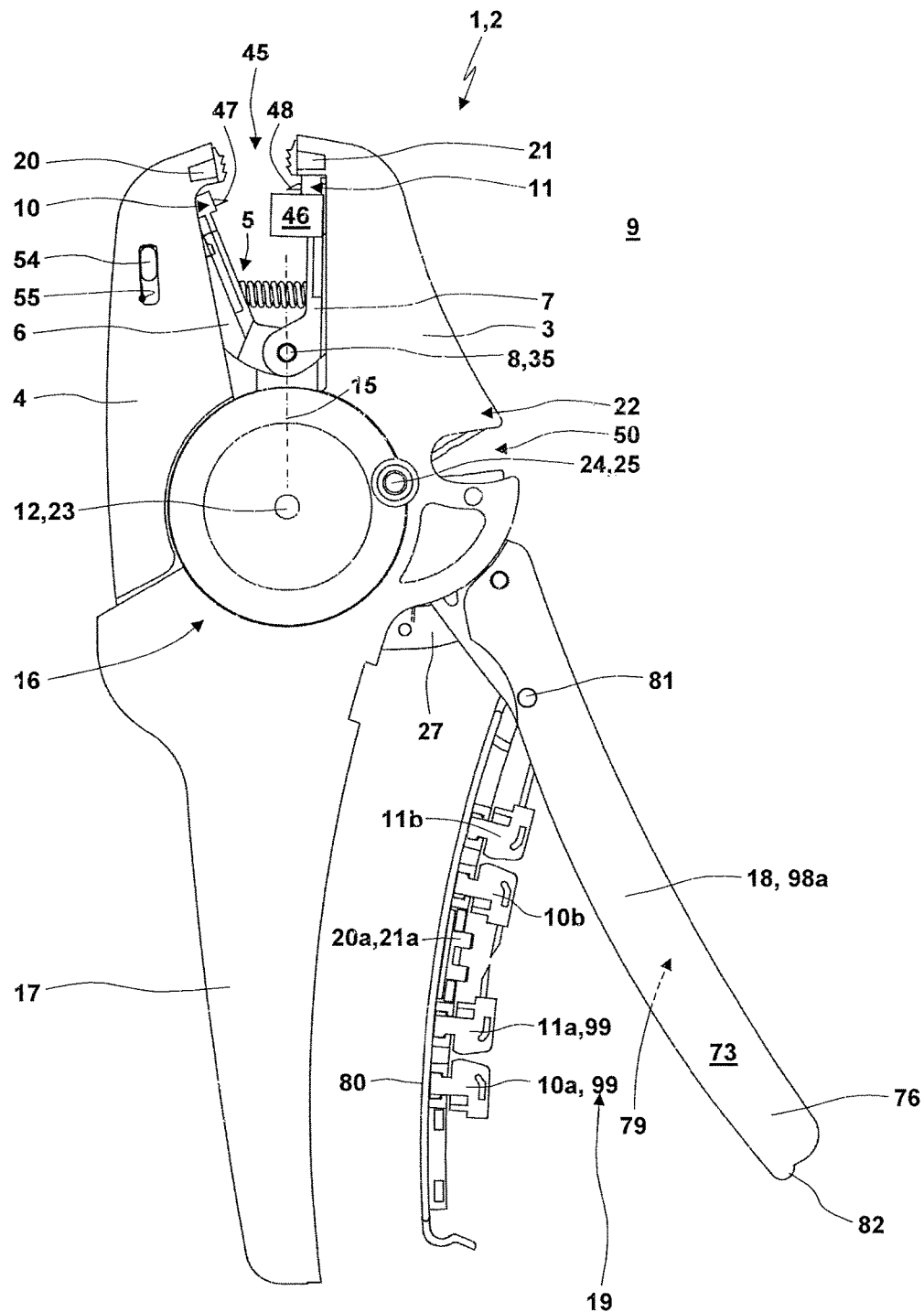
FIG. 1 shows cable stripping pliers in an insertion position with an open storage unit in a top view.

In the figures a cable stripping tool 1 in the shape of hand-operated cable stripping pliers 2 is shown without the invention being intended to be limited to hand-operated cable stripping pliers 2. The cable stripping pliers 2 have two pliers jaws 3, 4. Between the two pliers jaws 3, 4 a cable stripping unit 5 is accommodated, which is formed with two cable stripping jaws 6, 7. The cable stripping jaws 6, 7 are pivotally connected to each other in an end portion through a joint 8 with a pivot plane 9 having an orientation parallel to the plane of illustration according to FIG. 1. The cable stripping jaws 6, 7 in their free end portions each carry a cutting element 10, 11. The pliers jaws 3, 4 are pivotally connected to each other in the pivot plane 9 through a joint 12. Due to a contact of the pliers jaws 3, 4 with the cable stripping jaws 6, 7 and/or the cutting elements 10, 11 via contact surfaces 13, 14 of the pliers jaws 3, 4 a pivoting movement of the pliers jaws 3, 4 towards each other coincides with a pivoting of the cable stripping jaws 6, 7. The pivot angle of the pliers jaws 3, 4 is smaller than the pivot angle of the cable stripping jaws 6, 7 because the distance of the contact surfaces 13, 14 from the joint 12 is larger than the distance of the contact surfaces 13, 14 from the joint 8. Furthermore the cable stripping unit 5 with the cable stripping jaws 6, 7 is relatively slidable along a cable stripping axis 15 without a change of the pivot angle, which is provided by the formation of a sliding contact in the region of the contact surfaces 13, 14. The common pivoting of the pliers jaws 2, 4 on the one hand and the cable stripping jaws 6, 7 on the other hand towards each other forms a cutting or clamping stroke, while the movement of the cable stripping unit 5 along the cable stripping axis 15 without a change of the pivoting angle forms a cable stripping stroke.

A drive 16 causes the cutting stroke as well as the cable stripping stroke. For the embodiment shown, the drive 16 is realized with two hand levers 17, 18 and a gear connection inserted between the hand levers 17, 18 and the pliers jaws 3, 4 and the cable stripping unit 5. During a working stroke of the hand levers 17, 18 with a pivoting of the hand levers 17, 18 towards each other the gear connection subsequently provides the cutting stroke and the cable stripping stroke.

The hand lever 18 forms a storage unit 19, which serves for the storage of further pairs of cutting elements 10a, 11a; 10b, 11b. The cutting elements 10a, 11a; 10b, 11b may be exchanged for the cutting elements 10, 11 mounted with the cable stripping jaws 6, 7. For the embodiment shown the storage unit 19 also stores clamping jaws 20a, 20b; 21a, 21b, which may be exchanged for clamping jaws 20, 21, which are preferably elastically, which may be insertable into the outer end portion of the grooves of the pliers jaws 3, 4 and which hold and fix the cable inserted into the cable stripping pliers 2. While the clamping jaws 20, 21 in the state mounted with the pliers jaws 3, 4 have a comparably large extension in the direction vertically to the plane of projection of FIG. 1, their extension in the direction of the longitudinal axis of the inserted cable is comparably small. In the storage unit 19 the clamping jaws 20, 21 may be stored in a space-saving way without the need of an enlargement of the extension of the hand lever 18 vertically to the plane of illustration if the clamping jaws 20, 21 are stored with their extension in the direction of the longitudinal axis of the cable (for the clamping jaws 20, 21 mounted into the pliers jaws 3, 4) in the direction of the thickness of the hand lever 18 (that is, vertical to the plane of illustration according to FIG. 1).

Figure 2:
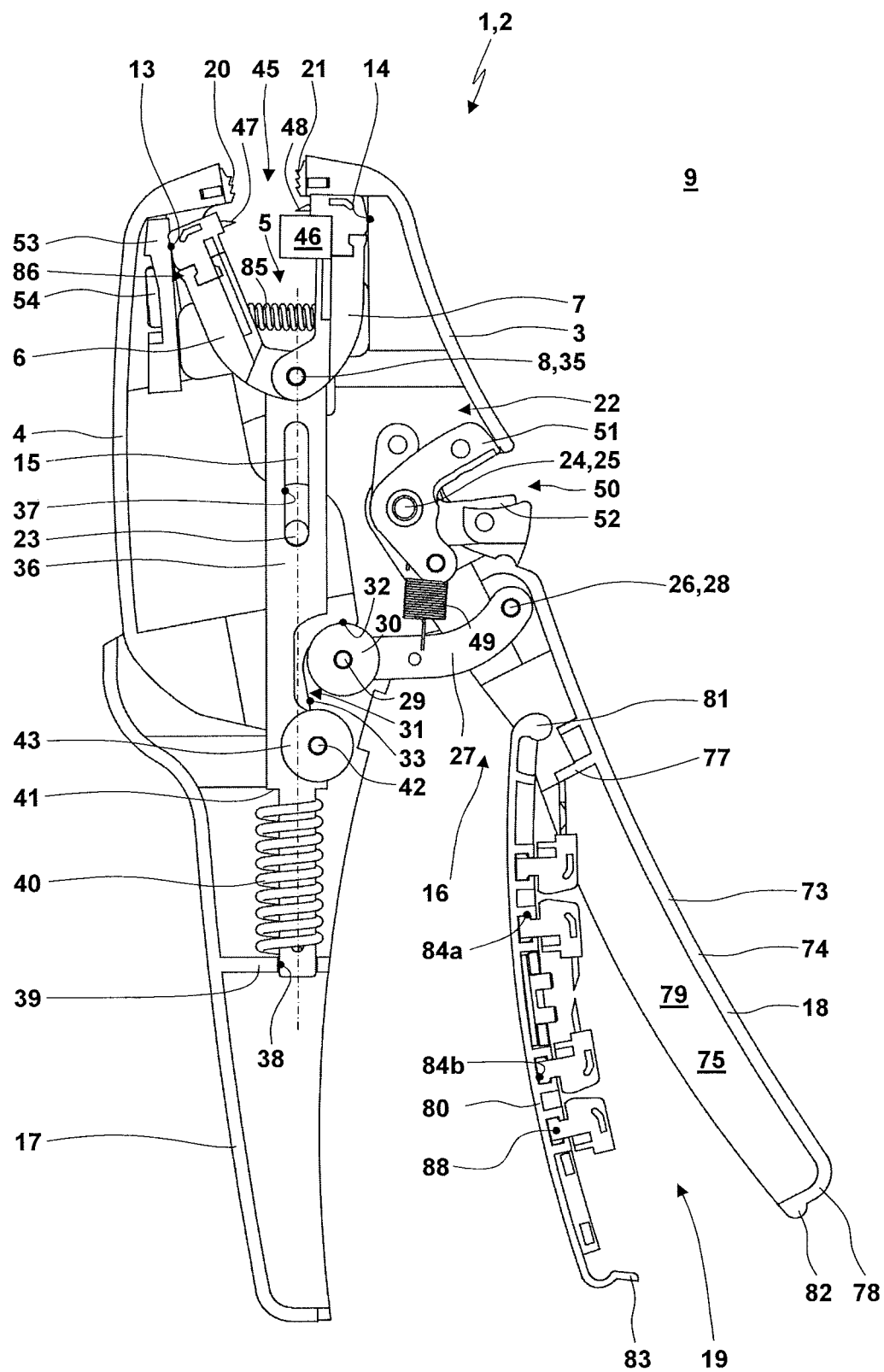
FIG. 2 shows the cable stripping pliers according to FIG. 1 in the insertion position with an opened storage unit in a section parallel to the plane of illustration of FIG. 1.

The construction and the kinematics of the cable stripping pliers 2 and the gear connection of the drive 16 may be seen from the cutaway view according to FIG. 2: The hand lever 17 and the pliers jaw 3 are unmovably connected to each other. With the pliers jaw 3 and the hand lever 17 therefore an unmovable or rigid pliers part 22 is formed. By the joint 12 the pliers jaw 4 is pivotally supported on the pliers part 22 in the pivot plane 9, which here is achieved by a bolt 23 fixed to the pliers part 22. By a joint 24 the hand lever 18 is pivotally supported on the pliers part 22 in the pivot plane 9, which here is achieved by a bolt 25. By a joint 26 an end portion of a pressure lever 27 is linked to the hand lever 18, which here is achieved by a bolt 28 fixed to the hand lever 18. In the other end portion of the pressure lever 27, via a mount 29 a roller 30 is pivotally supported on the pressure lever 27 in the pivot plane 9. The roller 30 rolls off a guide contour 31, which has a guide contour portion 32 (especially approximately quadrant-shaped), a guide contour portion 33 (especially straight and oriented approximately coaxial to the cable stripping axis 15) and a guide contour portion 34 (especially oriented approximately parallel the longitudinal axis of the pressure lever 27).

A bolt 35, by which the joint 8 of the cable stripping unit 5 is formed, also serves for the jointed connection of the cable stripping unit 5 with a draw shackle 36. The draw shackle 36 has only one translatory degree of freedom along the cable stripping axis 15. This degree of freedom is provided by a guiding of the draw shackle on the one hand by an elongated recess 37 of the draw shackle 36, in which the bolt 23 is guided essentially free of play perpendicular to the cable stripping axis 15. Furthermore the degree of freedom is provided by passing of the end portion of the draw shackle 36 facing away from the joint 8 through a guiding recess 38 of a wall 39 of the hand lever 17 having an orientation perpendicular to the cable stripping axis 15. The cable stripping stroke with a movement of the draw shackle 36 along the cable stripping axis 15 is achieved by the bias of a spring 40. For the embodiment shown the spring 40 is formed by a pressure spring wound in a coil-like way, which winds around the draw shackle 36 with several windings. One spring base of spring 40 is supported on the wall 39 while the other spring base is supported on the draw shackle 36, for example in the region of a ledge 41 of the draw shackle 36. A roller 43 is pivotally supported on the draw shackle 36 in the pivot plane 9 via a mount 42.

Figure 3:
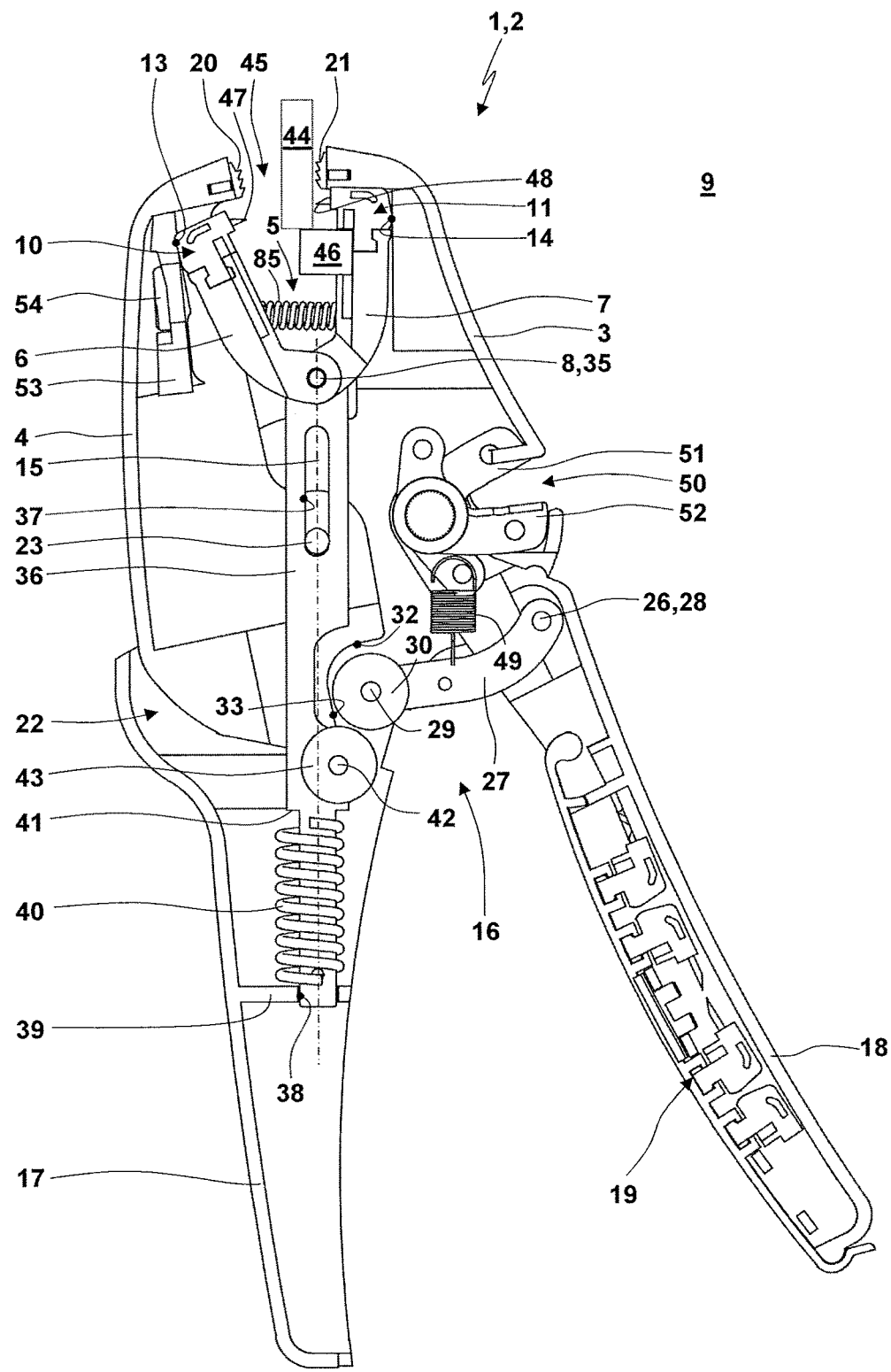
FIG. 3 shows the cable stripping pliers according to FIGS. 1 and 2 in the insertion position with a cable inserted and with closed storage unit in a section parallel to the plane of illustration of FIG. 1.

In the following a working stroke of the cable stripping pliers 2 is explained on the basis of FIGS. 3 to 6:

FIG. 3 shows the cable stripping pliers 2 in an insertion position. Without an application of hand forces onto the hand levers 17, 18 the hand levers 17, 18 as well as the pliers jaws 3, 4 and the cable stripping jaws 6, 7 take on the opening position to be seen in FIG. 3. This is achieved by a spring 85 which is preloaded also in the opening position and which acts upon the cable stripping jaws 6, 7 and with them the pliers jaws 3, 4 and the hand levers 17, 18 in an opening direction. In this insertion position it is possible to insert a cable 44 into a bit 45 formed by the pliers jaws 3, 4 and the cable stripping jaws 6, 7 with the cutting elements 10, 11 affixed thereto. The cable stripping jaw 7 and/or the cutting element 11 optionally has a distance element 46, which upon insertion of the cable 44 into the bit 45 is brought into contact with a front surface of the cable 44. This results in a defined distance of knives 47, 48 of the cutting elements 10, 11 from the front surface of the cable 44.

Figure 4:
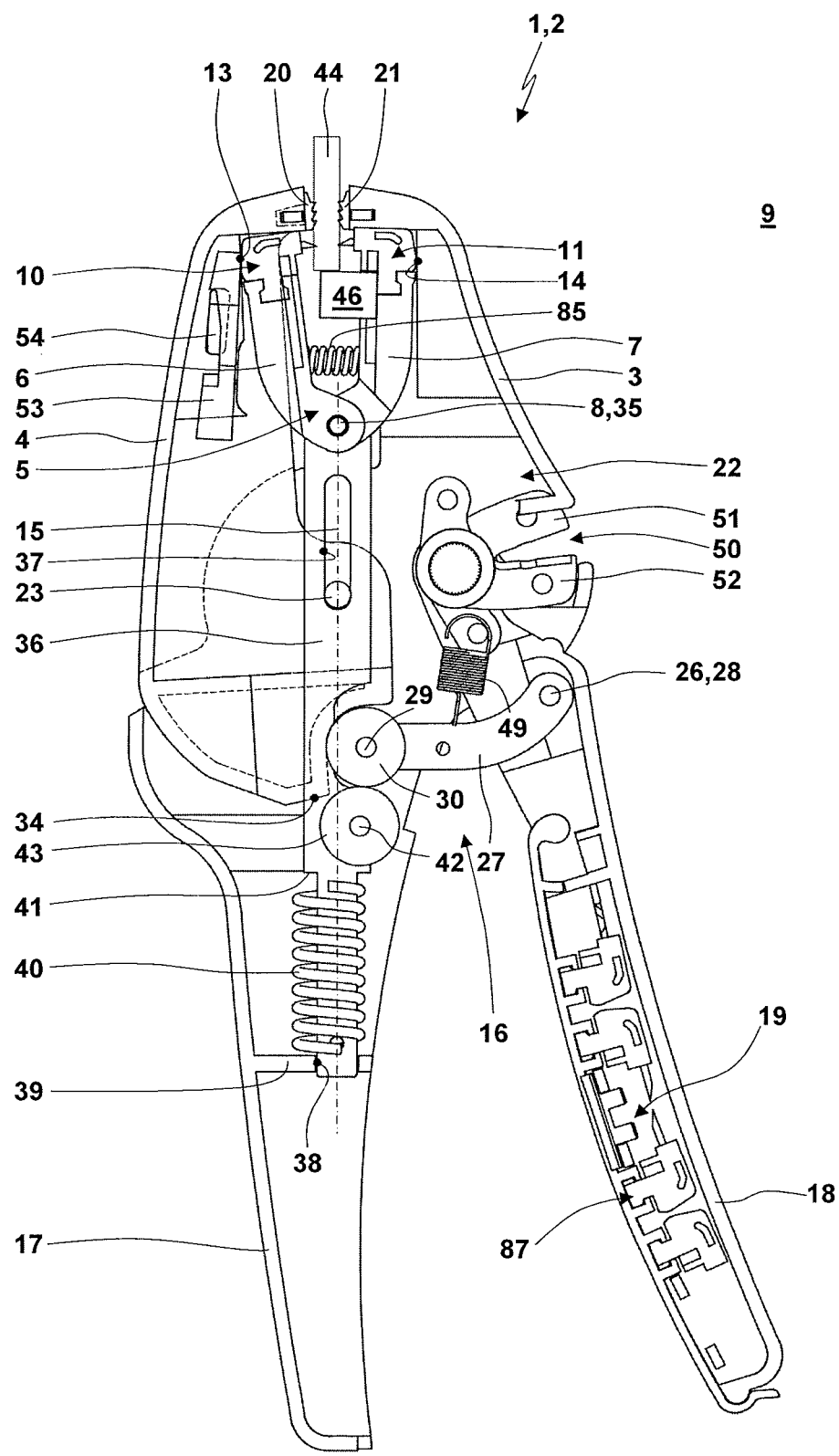
FIG. 4 shows the cable stripping pliers according to FIGS. 1 to 3 in a cutting and clamping position in a section parallel to the plane of illustration of FIG. 1, wherein compared to FIG. 3 the hand levers have been partially closed over a cutting stroke.

Beginning from this insertion position according to FIG. 3, a clamping and cutting stroke is achieved by a movement of the hand levers 17, 18 towards each other until the cutting position according to FIG. 4 is achieved. The movement of the hand lever 18 towards the hand lever 17 during the cutting and clamping strokes leads to the result that the pressure lever 27 is moved in the direction of the guiding contour 31. While in the start portion of the guiding contour portion 32 the roller 30 can still roll off the guiding contour 31 without applying significant forces to the pliers jaw 4, the inclination of the guiding contour portion 32 changes with continued rolling movement of the roller 30 along the guiding portion. In this way, an increasing force is applied by the pressure lever 27 upon the pliers jaw 4, so that an increasing force is applied to the pliers jaw 4 which is directed towards a pivoting of pliers jaw 4 towards the pliers jaw 3. After closing the bit 45, on the one hand the clamping force for the outer surface of the cable 44 evoked at the clamping jaws 20, 21 and on the other hand the cutting and contact forces of the knives 47, 48 of the cable stripping unit 5 counteract the actuating force generated by the pressure lever 27 and the roller 30 on the guiding contour portion 32 of the guiding contour 31. In the cutting position according to FIG. 4 the roller reaches the transition between the guiding contour portions 32, 33. In this cutting position according to FIG. 4, the roller 30 of the pressure lever 27 touches the roller 43 of the draw shackle 36.

Figure 5:
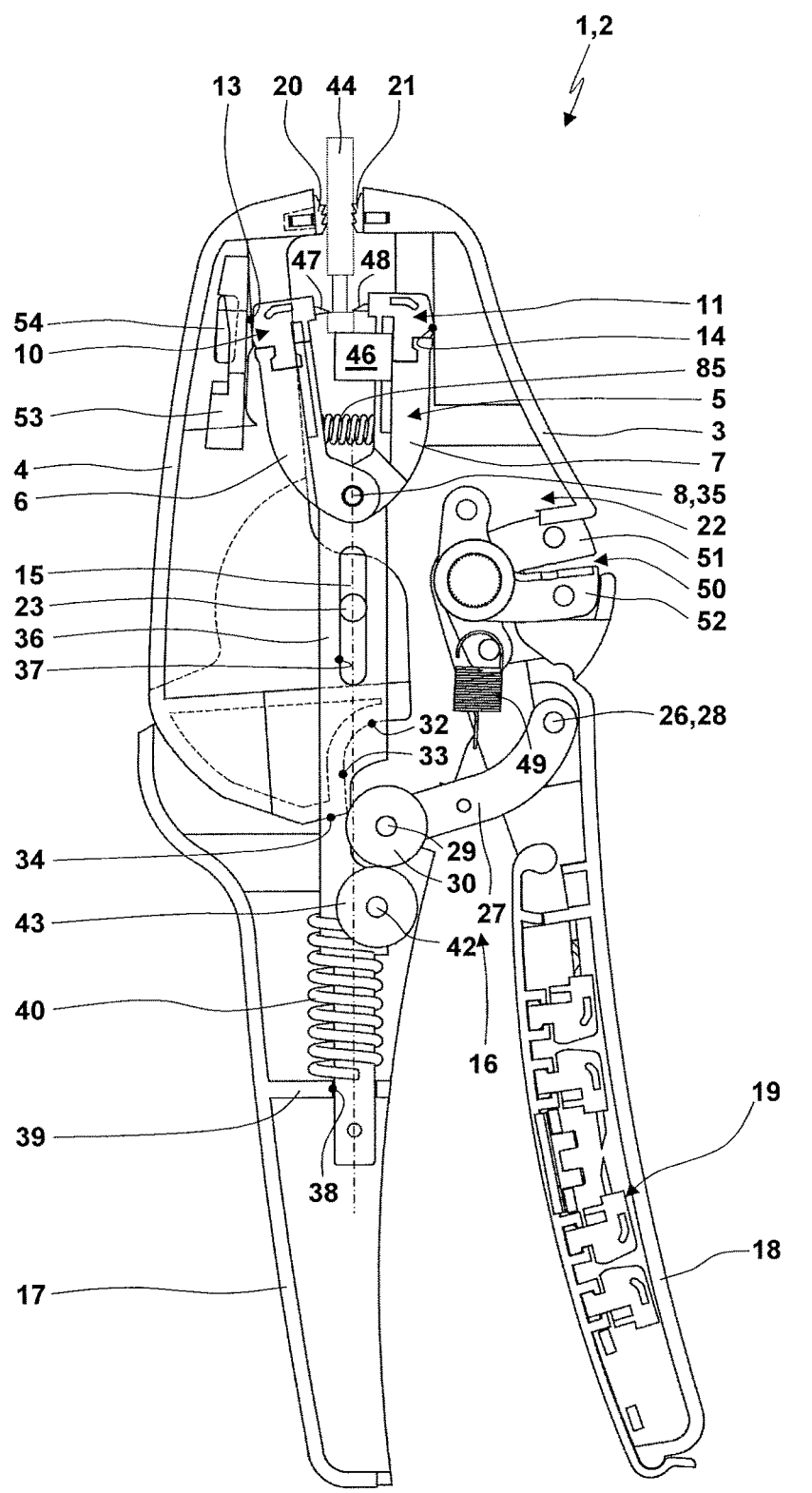
FIG. 5 shows the cable stripping pliers according to FIGS. 1 to 4 in a section parallel to the plane of illustration of FIG. 1 in a cable stripping position, wherein compared to FIG. 4 the hand levers have been further closed over a cable stripping stroke.

In the cutting position according to FIG. 4, the connecting axis between the joint 26 and the mount 29 of the pressure lever 27 forms an angle with the cable stripping axis 15 which is smaller than 90°. If in a subsequent cable stripping stroke to induce the stripped position according to FIG. 5 the actuating force applied upon the hand lever 18 is further increased, the orientation of the pressure lever 27 described above leads to a longitudinal force in the pressure lever 27 resulting in a force component which has an orientation parallel to the cable stripping axis 15. This force component is transmitted onto the roller 43 and therefore onto the draw shackle 36 by the roller 30 through a rolling contact. The force component causes a displacement of the roller 43 and the draw shackle 36 under increasing bias of the spring 40 along the cable stripping axis 15. Due to the coupling of the cable stripping unit 5 in the region of the joint 8, this is accompanied by a sliding movement of the cable stripping unit 5 relative to the pliers jaws 3, 4. Furthermore this cable stripping stroke is accompanied by a rolling movement of the roller 30 along the guiding contour portion 33, which again causes a growing pivoting of the pressure lever 27 with a reduction of the angle of the connecting axis of the joint 26 and the mount 29 with respect to the cable stripping axis. The force characteristics for this cable stripping stroke are influenced by the preloading and stiffness of the spring 40 and the friction characteristics for the sliding movement of the cable stripping unit 5 relative to the pliers jaws 3, 4 in the region of the contact surfaces 13, 14. Additionally, to influence the force characteristics, a further spring 49 may act upon the pressure lever 27. The cable stripping stroke explained above leads to the result that (after having severed the insulation by the knives 47, 48 within the cutting stroke) the knives 47, 48 are moved in a closed state relative to the cable 44 with a cable 44 generally being fixed in the region of the clamping jaws 20, 21, so that the axial portion cut free on the end side of the insulation is pulled off the conductor. The maximum cable stripping stroke is defined by the length of the guide contour portion 33. FIG. 5 shows the stripped position. In the stripped position the roller 30 has reached the transition region between the guiding contour portions 33, 34.

Figure 6:
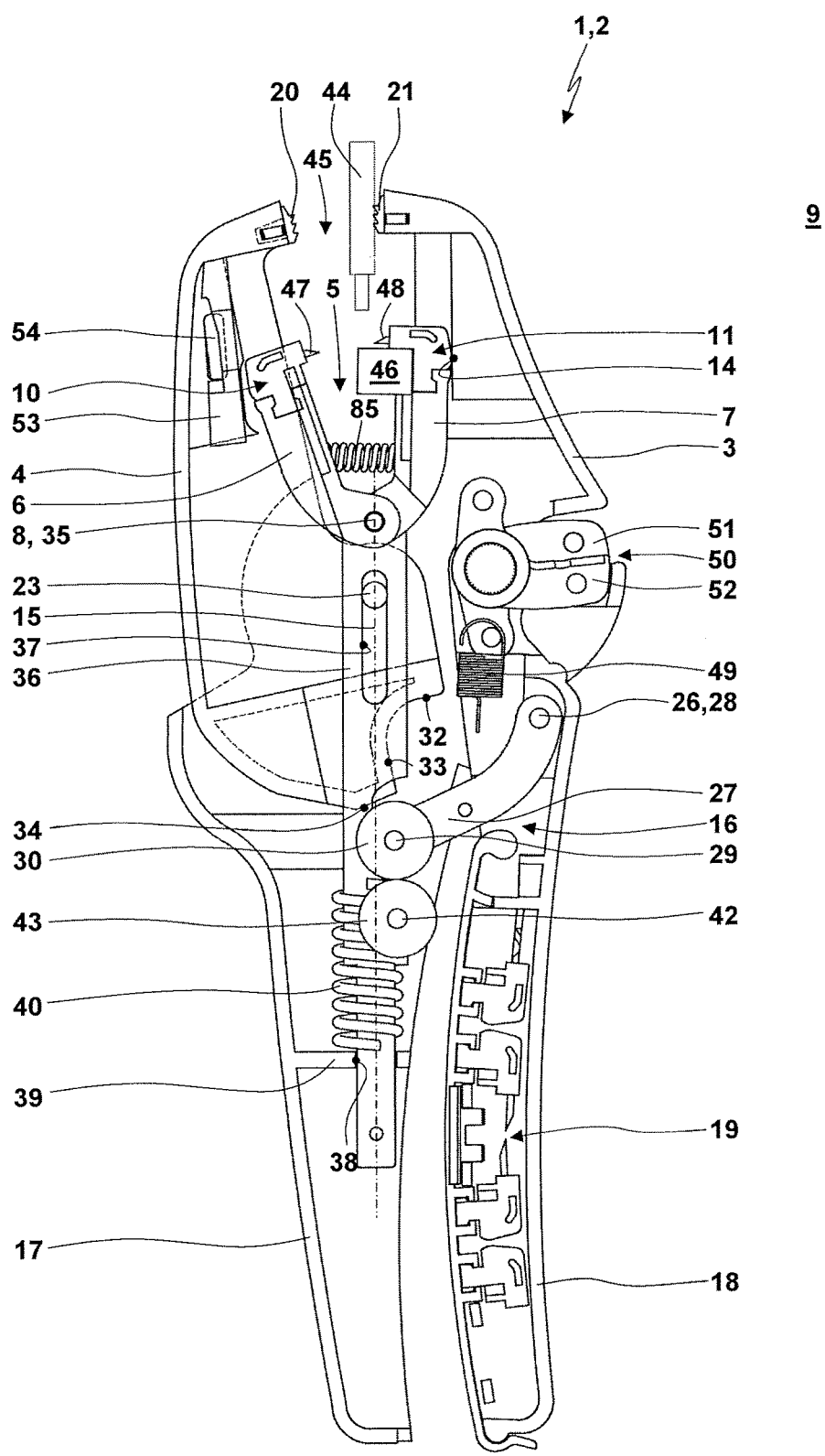
FIG. 6 shows the cable stripping pliers according to FIGS. 1 to 5 in a section parallel to the plane of illustration of FIG. 1 in an exchange and removal position, wherein compared to FIG. 5 the hand levers have been further closed.

With a further closing of the hand levers 17, 18, the roller 30 then can than roll off the guiding contour portion 34, at which point preferably the guiding contour portion 34 has an orientation approximately parallel to the connecting axis of the joint 26 and the mount 29. This on the one hand results in the hand levers 17, 18 being able to be closed further without further significant application of hand forces upon the hand levers 17, 18. On the other hand, the roller 30 then no longer forms an abutment for the pliers jaw 4, so that the spring 40 can transfer the cable stripping jaws 6, 7 and the pliers jaws 3, 4 back to the opening position. In this way, a removal position according to FIG. 6 is reached, in which the stripped cable 44 may be removed from the bit 45 now open again and the axial portion of the insulation drops out of the bit 45. At the same time the removal position according to FIG. 6 is an exchange position, which will be detailed in the following. When reaching the removal and exchange position according to FIG. 6, the working stroke of the cable stripping pliers 2 is ended.

With the removal of the hand forces applied to the hand levers 17, 18, the hand levers 17, 18 (caused by the springs 40, 39) return to the opened position. In this way, the insertion position according to FIG. 3 is again reached and another cable 44 can be stripped with the cable stripping pliers 2.

Optionally, the cable stripping pliers 2 are equipped with another tool, that is, a cutting mechanism 50, which is also operated by operating the hand levers 17, 18 and which encompasses two knives 51, 52. By closure of the hand levers 17, 18 the knives 51, 52 completely sever a cable inserted into the cutting mechanism 50 (for the design of the cutting mechanism and its connection to the hand levers via a gear drive cp. also the prior art given above).

The contact surface 14 for the cable stripping jaw 7 is formed directly by the pliers jaw 3. On the contrary, the contact surface 13 for the other cable stripping jaw 6 is formed by a support element 53, which by an adjustment element 54 can be shifted in such a way that depending on the position of the support element 53 a change in the pivot angle of the cable stripping jaws 6, 7 with respect to the pivot angle of the pliers jaws 3, 4 is possible. In this way, via the adjustment element and the setting of the position of the support element 53 it can be set how deep the knives 47, 48 cut into the cable 44, to be able to accommodate different thicknesses of insulation. For the embodiment shown, the adjustment element extends through a guide slit 55 of the pliers jaw 4, so that the latter may be displaced along the guide slit 55 by the user from the outside. The adjustment element 54 via contact surfaces inclined with respect to the guide slit 55 in the way of a double wedge operates the support element 53.

Figure 7:
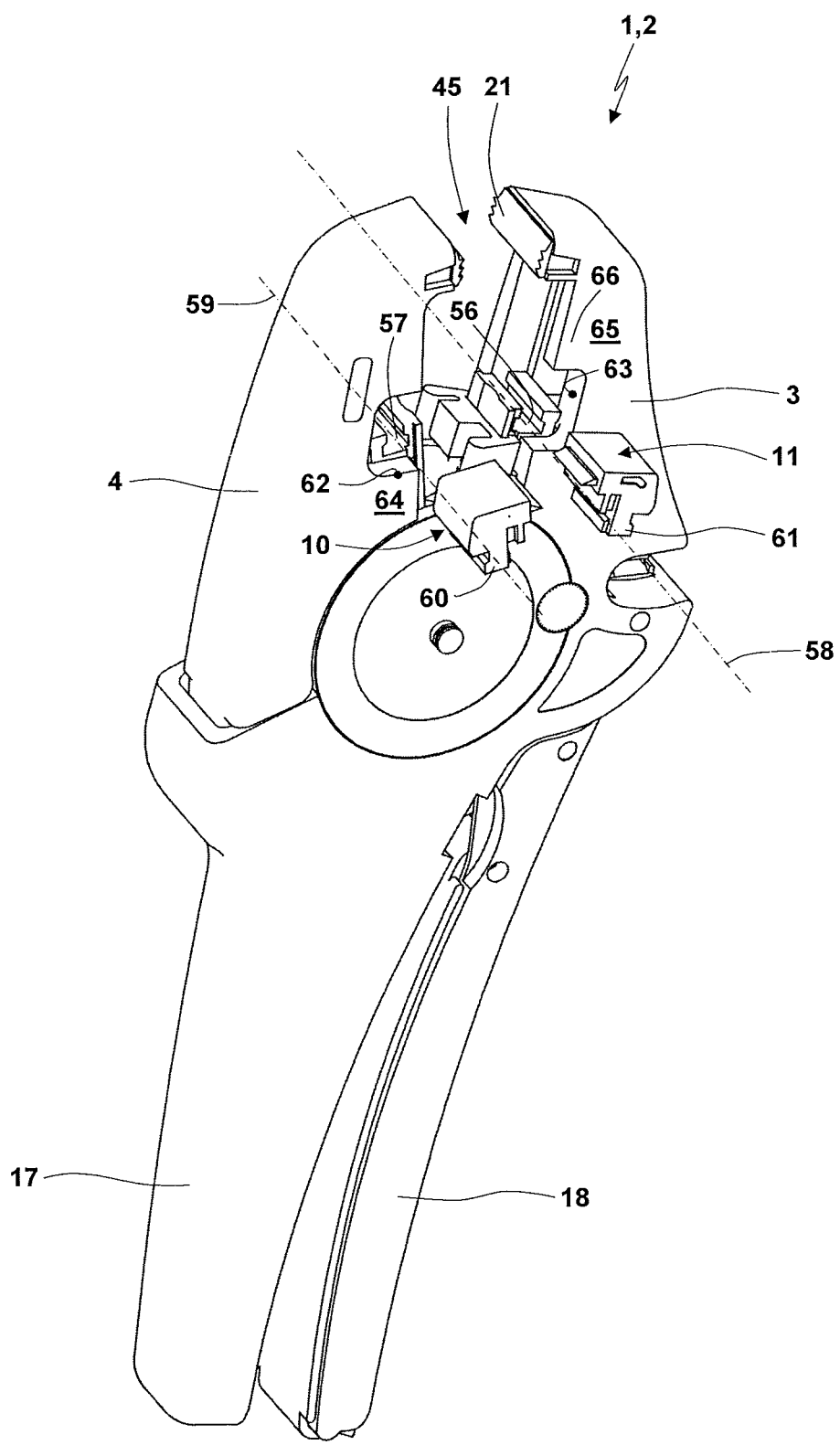
FIG. 7 shows the cable stripping pliers according to FIGS. 1 to 6 in a three-dimensional view with the cutting element demounted.

FIG. 7 shows the cable stripping pliers 2 in a three-dimensional view in the removal and exchange position. It can be seen that the front surfaces of the cable stripping jaws 6, 7 facing away from the joint 8 are each equipped with mounting grooves 56, 57. The longitudinal axes of the mounting grooves 56, 57 each form mounting axes 58, 59. In the direction of the mounting axes 58, 59 mounting elements 60, 61 of the cutting elements 10, 11 may be inserted into the mounting grooves 56, 57 of the cable stripping jaws 6, 7. The mounting grooves 56, 57 in the area of their bottom have extensions with which undercuts are formed. Accordingly, the mounting elements are realized as protrusions with extensions at their end sides, which engage with the undercuts of the mounting grooves 56, 57, forming a positively locked connection to accommodate any forces in the pivot plane 9. A securing of the cutting elements 10, 11 against the cable stripping jaws 6, 7 generally is achieved through the friction between the mounting grooves 56, 57 and the mounting elements 60, 61. Preferably, the mounting grooves 56, 57 as well as the mounting elements 60, 61 each have a cross section which in a rough approximation is T-shaped. The positively locking engagement of the mounting element 60, 61 into the mounting groove 56, 57 may also be formed by a dovetail joint 86.

The cutting element 10, 11 with its mounting element 60, 61 can only be inserted into the mounting groove 56, 57 in the exchange position according to FIG. 7, because in the exchange position the mounting groove 56, 57 is accessible through a recess or a cutaway 62, 63 of a side wall 64, 65 of the pliers jaw 3, 4 having an orientation parallel to the pivot plane 9. If the cable stripping pliers 2 leave the exchange position according to FIG. 7, the cable stripping jaws 6, 7 with the cutting elements 10, 11 held thereon are moved forwards with respect to the side wall 64, 65, so that the cutting elements 10, 11 are no longer accessible. It is rather the case that outside of the exchange position the cutting elements 10, 11 are caught between the side walls 64, 65 of the pliers jaws 3, 4 so that these (apart from possible play), cannot move along the mounting axes 58, 59 in a undesired way outside of the exchange position. As can be seen from FIG. 7, only one side wall of the pliers jaw may be equipped with a recess 62, 63, through which then mounting and demounting are performed, while the other side wall of the same pliers jaw is not equipped with such a recess. Therefore outside of the exchange position the side wall 64, 65 forms a securing element 66, which blocks the cutting element 10, 11 in the direction of the mounting axis 58, 59.

Figure 8:
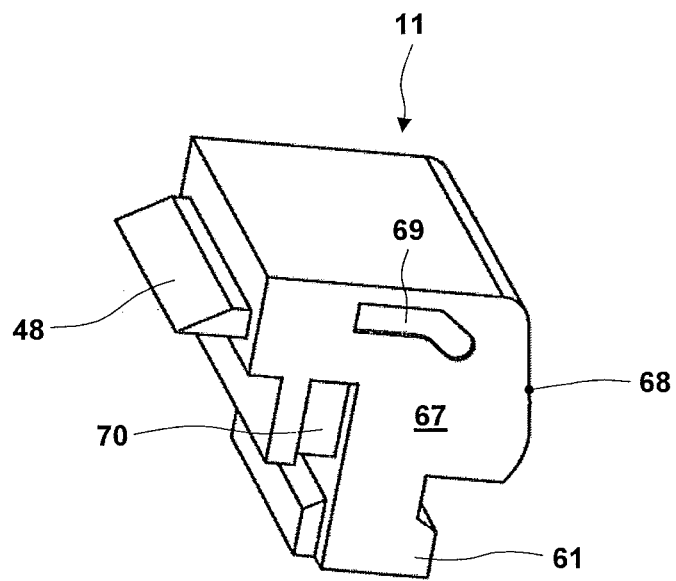
FIG. 8 shows a cutting element in a three-dimensional view.

FIG. 8 in a three-dimensional view in an exemplary way shows the cutting element 11 (while for the other cutting element 10 the same applies as appropriate). The cutting element 11 is e.g. formed by a knife 48 with a straight cutting edge, while it is possible to employ different cutting edges, for example with at least one concave cutting edge or two knife knifes placed behind each other with a straight cutting edge each while the cutting edges are aligned in a V shape or lamella-like knives. The knife 48 has been encased with a holding body 67 made of plastic. The holding body 67 on the side facing away from the knife 48 forms a contact surface 68, by which the cutting element 11 may be supported on a corresponding contact surface 14 of the pliers jaw 3. Furthermore, in FIG. 8 the mounting element 61 can be seen which is formed with a ledge with a T-shaped extension in its end portion. Furthermore, in the side region of the holding body 67 handling surfaces 69 may be provided, which simplify manual handling of the cutting element 11. For example, the handling surfaces 69 may be roughened, to facilitate gripping by hand. It is possible that in the side region of the holding body 67 a guiding groove 70 is present, which is open in the direction of the related cable stripping jaw 7.

Figure 9:
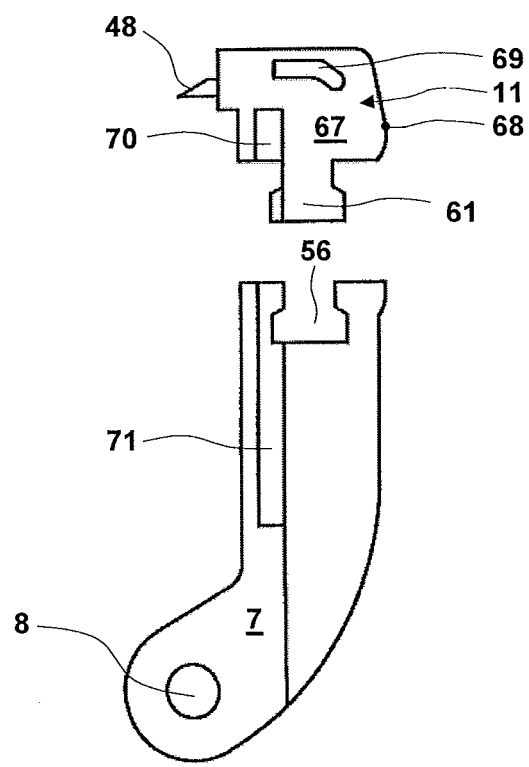
FIG. 9 in an exploded view shows a cutting element and the associated cable stripping jaw.

FIG. 9 shows a cable stripping jaw 7 with an associated cutting element 11 in a demounted state. The mounting axis 58 has an orientation vertical to the plane of illustration. The cable stripping jaw 7 has a guiding groove 71, too. With the mounting of the cutting element 11 to the cable stripping jaw 7, the guiding grooves 70, 71 complement one another so that a continuous straight guiding groove is formed. This commonly formed guiding groove serves for accommodating the distance element 46, which grips around the cable stripping jaw in a U-shape on the side oriented towards the bit 45, whereby angled portions formed on the end sides of the vertical arms of the U enter into the guiding grooves 70, 71. The distance element 46 is movable along guiding grooves 70, 71 for changing the length of the axial region of the insulation which is to be removed. Supplementary, a latching or locking or other fixing of a set position of the distance element may be possible which is not shown here (in this regard cp. e.g. DE 20 2008 014 111 U1). It is possible that in a demounted state the distance element 46 is put onto the guiding groove 70 of the cutting element 11 or the guiding groove 71 of the cable stripping jaw 7 and then the cutting element 11 is mounted with the cable stripping jaw 7. In this way the distance element 46 is caught in the common guiding groove formed with the guiding grooves 70, 71 in such a way that it cannot be lost. It is understood that the cable stripping jaw 6 and the cutting element 10 are formed correspondingly, possibly mirrored. The cutting elements 10, 11 for the two cable stripping jaws 6, 7 may also be formed identically, where these may then be mounted in a reverse orientation with the different cable stripping jaws 6, 7.

Figure 10:
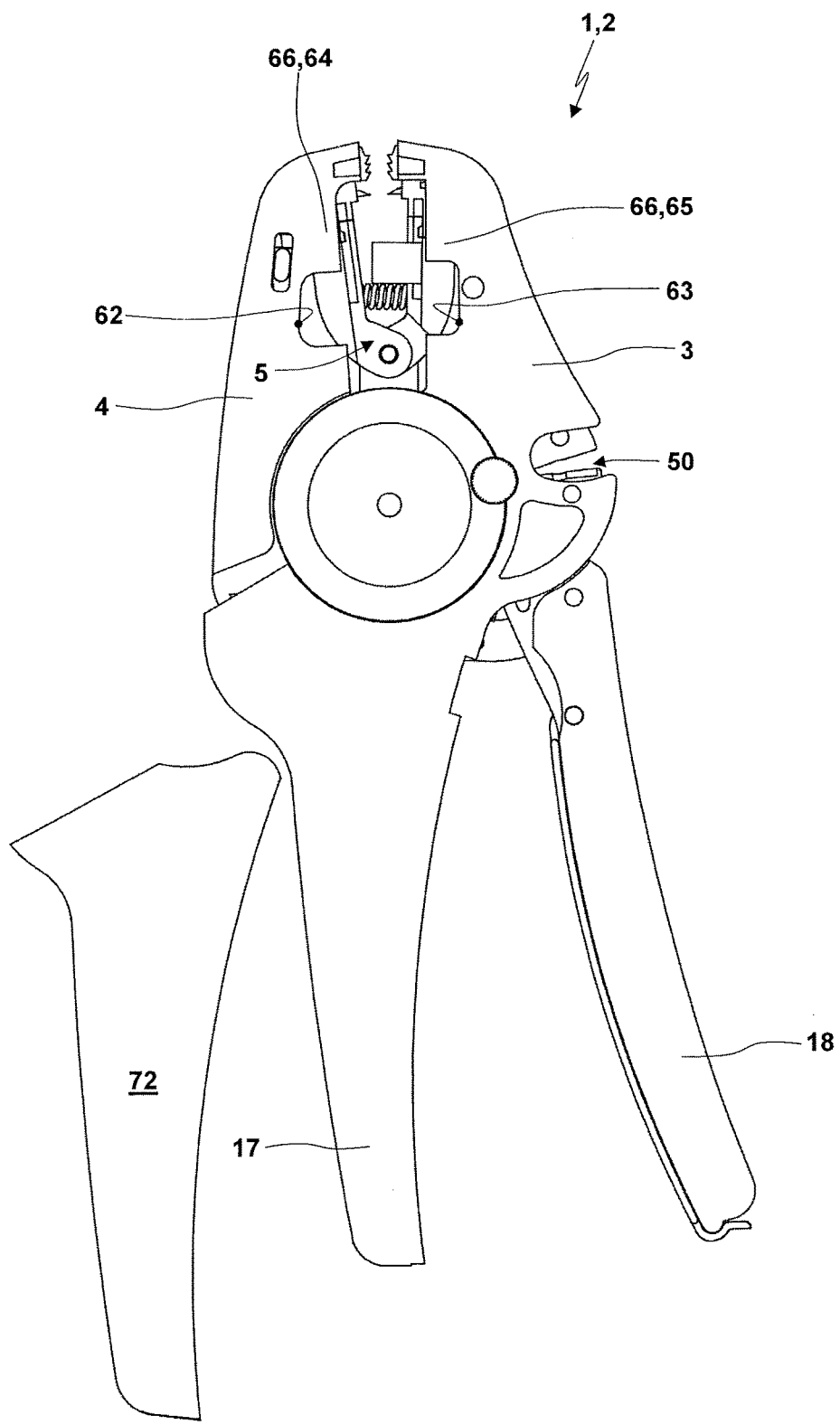
FIG. 10 shows a top view on cable stripping pliers with a hand lever, which is formed with a separate casing.

As can be seen from FIG. 10, at least one of the hand levers 17 may be equipped with a casing 72, which may be able to be slipped onto a base body of the hand lever, attached adhesively or in any other way to it. By the casing 72 an elasticity may be defined to induce a soft grip feeling. It is possible that by the casing 72 (for example by choice of shape or color) an individualization of the cable stripping pliers 2 for different customers is achieved. It is also possible that through the casing an adaptation to different sizes of hands of the user of the cable stripping pliers 2 is achieved.

As can be seen especially from FIGS. 1 and 2, the hand lever 18 which forms the storage unit 19 (which especially is the movable hand lever) is built with a base body 73. The base body 73 serves for applying and transferring operating forces and therefore has a corresponding stiffness. In the region of the storage unit 19 the base body 73 is U-shaped in rough approximation, where the opening of the U has an orientation in the direction of the other hand lever 17. The U-shaped cross section of the base body 73 is here formed with a base arm 74 and two side arms 75, 76 oriented approximately parallel. By the base body 73 an interior chamber 79 open in the direction of the hand lever 17 is formed. In the direction of the longitudinal axis of the hand lever 18 the interior chamber 79 of the base body 73 is limited on the one hand by a wall and on the other hand by a wall 78 of the hand lever 18 on the end side. The interior chamber 79 can be closed by a lid 80. The lid 80 is linked to the base body 73 via a pivot mount 81 outside the interior chamber 79 in the end portion facing towards the pliers head of the cable stripping pliers 2. FIGS. 1 and 2 show different positions of the lid 80, while FIG. 3 shows a closed position of the lid 80. The base body 73 in the region of the wall 78 placed in the free end portion of the hand lever 18 forms a snap lug 82. In the closed position of the lid 80 according to FIG. 3 an elastic angled portion 83 of the lid 80 locks or latches with the snap lug 82, in which way the closed position of the lid 80 is secured against unintended opening. On the inner side of the lid 80, mounting grooves 84 are provided, which have an orientation vertical to the pivot plane 9 and to the plane of movement of the hand levers 17, 18 as well as to the pivot plane of the lid 80. Cutting elements 10, 11 to be stored for an exchange may be inserted into the mounting grooves 84. While for an open lid 80 the cutting elements 10, 11 may be slid out of the mounting grooves 84 without further actions, it is not possible for the cutting elements 10, 11 to leave the mounting grooves 84 when the lid 80 is closed, because the leaving of the cutting elements 10, 11 is blocked by the walls of the base body 73 forming the side arms 75, 76. The mounting grooves 84 are, according to the mounting grooves 56, 57, formed in such a way that the mounting elements 60, 61 of the cutting elements 10, 11 may be used. The mounting grooves 84 set a mounting axis 88, which has an orientation perpendicular to the pivot plane 9 in which the hand levers 17, 18 are pivoted and has an orientation vertical to the plane of illustration according to FIG. 1. In the storage unit 19 the cutting elements are also held by dovetail joints 87. Additionally, it is possible to store clamping jaws 20, 21 in the storage unit 19. For this purpose on its inside the lid 80 can also have matching accommodation or mounting grooves.

For the embodiment shown, the cable stripping jaws 6, 7 are provided with the mounting grooves 56, 57, while the cutting elements 10, 11 are provided with the mounting elements 60, 61. It is also possible that the cable stripping jaws 6, 7 have the mounting elements 60, 61, while the mounting nuts 56, 57 are provided on the cutting elements 10, 11.

Within the scope of the present invention, an "exchange position", in which only mounting and demounting of the cutting elements 10, 11 is possible, encompasses a discrete position as well as a position region. It is also possible that there are several exchange positions.

Figure 11:
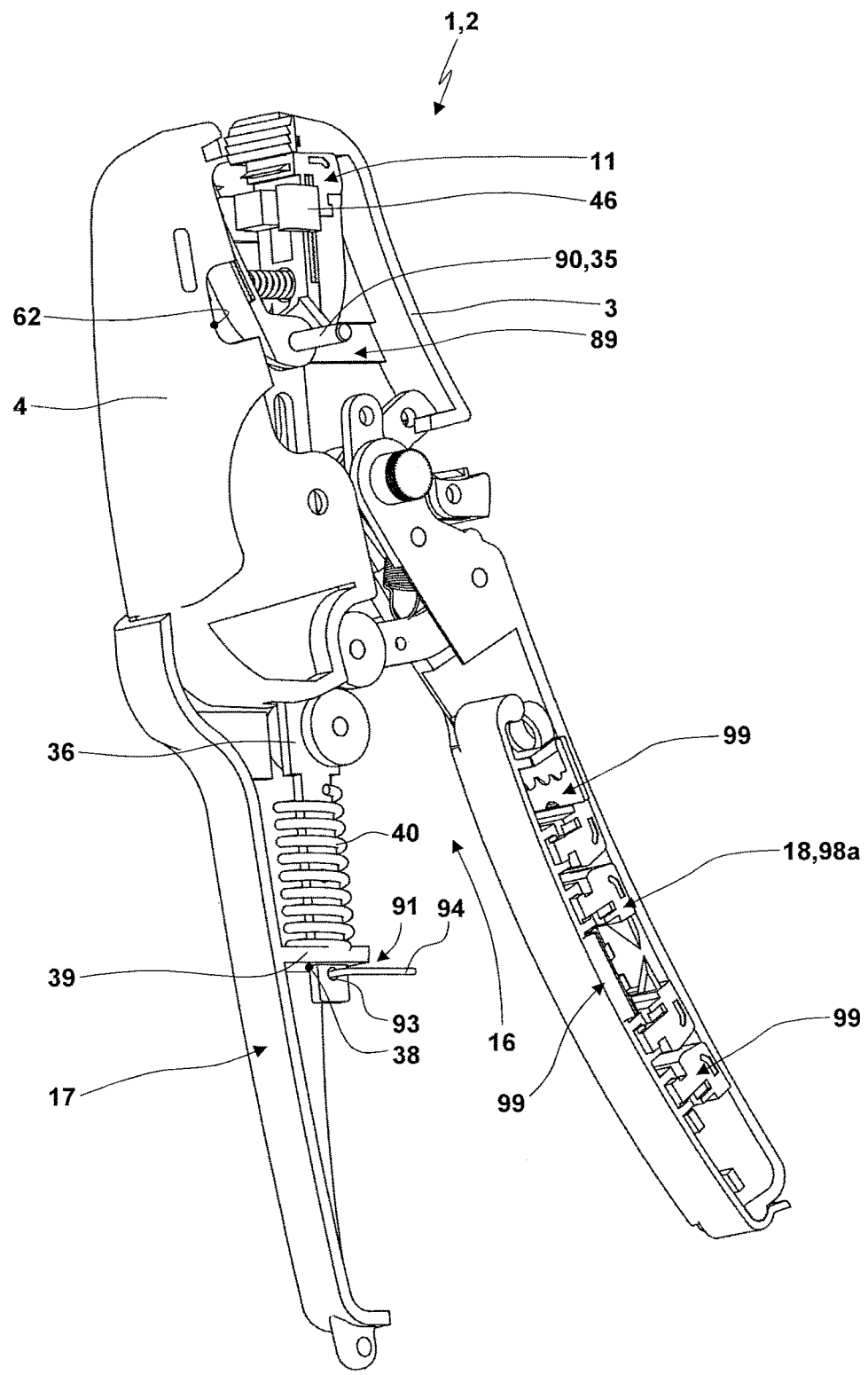
FIG. 11 in a partially-cut three-dimensional view shows another embodiment of cable stripping pliers.

FIG. 11 shows another embodiment of cable stripping pliers 2, which, barring further remarks, may generally be realized according to the cable stripping pliers 2 according to the FIGS. 1 to 10. In FIG. 11 the cable stripping pliers 2 are shown partly cut. Here parts of the hand levers 17, 18 and the pliers jaws 3 have been cut away. For this embodiment, the operating position of the cable stripping pliers 2 may not be changed only by actuation of the drive 16 formed with the hand levers 17, 18, which is responsible for applying the operating forces for processing the work piece, especially for the severing of the insulation in the cutting stroke and the stripping in the cable stripping stroke. Rather a manual change of an operating position and especially the manual inducement of an exchange position is possible also by another drive 89, which can be operated without pivoting the hand levers 17, 18 and which is not used for processing the work piece. The other drive 89 is formed with a manual operating element 90. For the embodiment shown, the operating element 90 is formed with the bolt 35, which is here led out of a housing of the cable stripping pliers 2 through a slit (not shown) or which is freely accessible from the outside. It is possible that the operating element 90 is guided by a slit in a housing related to the rigid pliers part 22 along the cable stripping axis 15. In the insertion position of the cable stripping pliers 2 shown in FIG. 11 the operating element 90 is manually displaced in the direction of the cable stripping axis 15. This leads to a shift of the draw shackle 36 along the cable stripping axis 15. Here the forces manually applied must be sufficient to overcome the force of the spring 40. While the pliers jaws 3, 4, the pressure lever 27 and the hand levers 17, 18 during this operation of the drive 89 may keep their position, the movement of the draw shackle 36 due to the coupling via the joint 8 also leads to a movement of the cable stripping unit 5 along the cable stripping axis 15. Therefore, there will be a relative shift between the cable stripping jaws 6, 7 and the cutting elements 10, 11 mounted on them on the one hand and the pliers jaws 3, 4 on the other hand until the cutting elements 10, 11 are placed in the region of the recesses 62, 63 of the side walls 64, 65 of the pliers jaws 3, 4. In this way an exchange position is reached in which the cutting elements may be demounted along the mounting axis 58, 59 and new cutting elements 10a, 10b may be mounted.

It is possible that (to keep up an exchange position induced in this way) the operating element 90 still has to have pressure applied on it manually, so that the spring 40 is not able to cause a movement out of the exchange position. However, it is also possible that in the exchange position induced in this way a locking or latching mechanism 91 comes into effect, which secures the exchange position. In this way, the locking or latching mechanism may lock or latch any construction element which is moved for the inducement of the exchange position. If a latching mechanism is used, this may generate a latching force which is larger than the force generated by the spring 40. In this case, overcoming of the latching force is achieved by complementing the force of the spring 40 with loosening forces applied manually to the operating element 90, which are directed away from the exchange position. For the case that a locking mechanism is employed, a locked position may be left by manual removal of a locking element.

Figure 12:
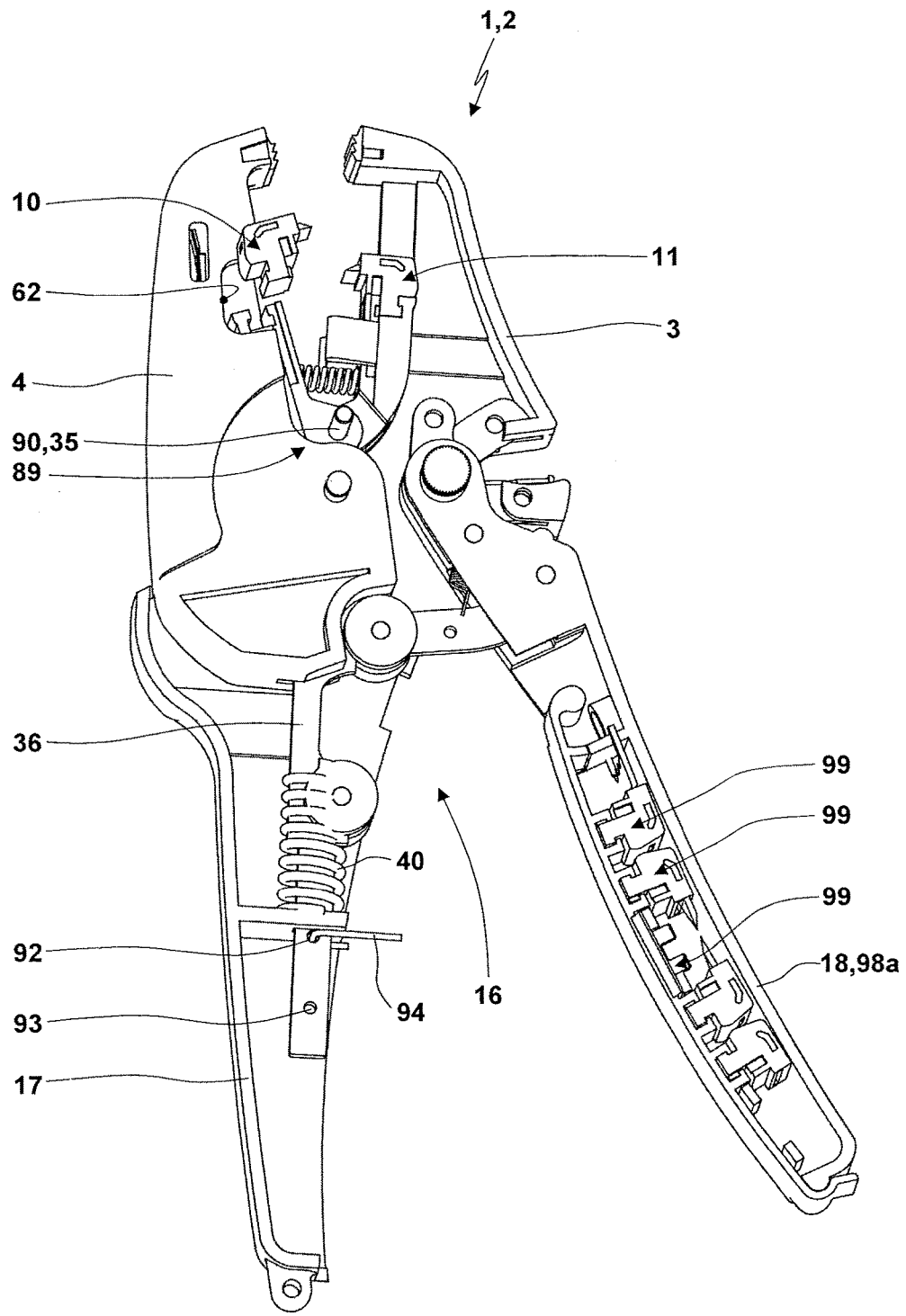
FIG. 12 in a changed partially-cut three-dimensional view shows the cable stripping pliers according to FIG. 11.

FIGS. 11 and 12 only show an exemplary embodiment of a locking or latching mechanism 91 without the invention being intended to be limited to this embodiment. Here, the draw shackle 36 in the end portion which extends through the recess 38 in the wall 39 of the hand lever 17 is equipped with two axially distanced bores 92, 93. By means of a locking element 94 which can be inserted into the bores 92, 93 (here a wire bracket) different axial positions of the draw shackle 36 can be secured. For the embodiment shown, a positively locked securing and therefore locking of the exchange position is possible by inserting the locking element 94 into the bore 92 according to FIG. 12. As can also be seen from FIG. 12, by operating the drive 89 removal of the cutting elements 10, 11 is also possible in the insertion position of the pliers jaws 3,4 and the hand levers 17, 18, so that as an alternative an exchange is possible in the insertion position and in the removal position.

It is also possible, however, that the exchange is only possible in an exchange position induced by the drive 89, in which case a removal position may entirely be dispensed with and removal may be performed in the insertion position.

According to the invention, in at least one of the drives 16, 89 a movement-controlled freeing of the cutting elements 10, 11 is used.

It is possible that in the storage unit 19 also cutting elements 51, 52 of the cutting mechanism 50 to be disposed for an exchange are stored.

Alternatively or cumulatively to an integration of the storage unit 19 into a hand lever 18, a storage unit 19 may also be integrated into a pliers head 95. For the shown embodiment according to FIG. 13 storage units 19a and 19b are integrated into the pliers head 95. The storage unit 19a is integrated into the pliers part 22, here the pliers jaw 3. On the contrary, the storage unit 19b is integrated into the movable pliers jaw 4. The pliers jaws 3, 4 each have a recess 96a, 96b, which can (at least partly) be closed by a lid 80a, 80b.

Figure 13:
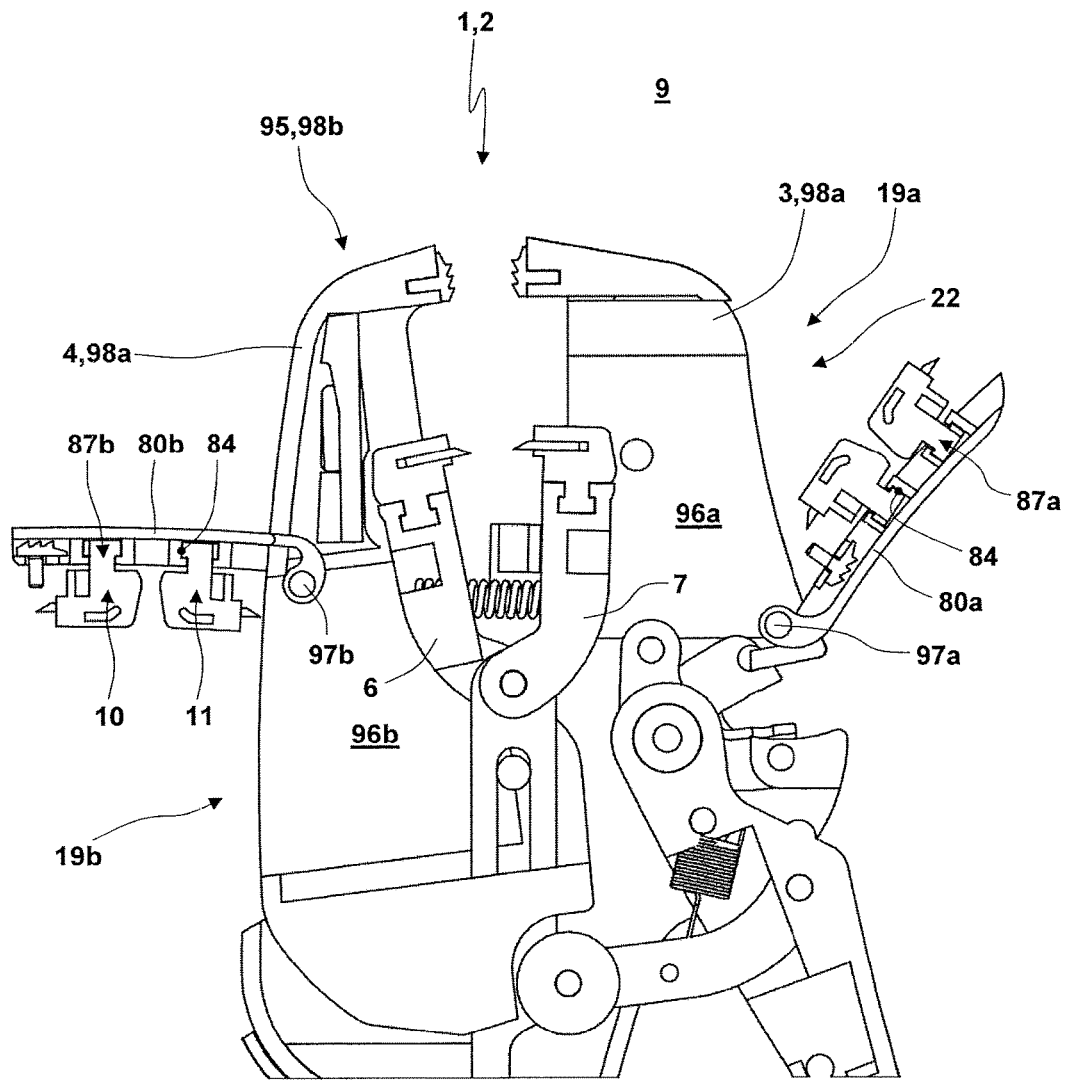
FIG. 13 shows a pliers head of other cable stripping pliers with storage units for accessories integrated into the pliers head with the storage units shown in an open position here.

For the embodiment shown, the lids 80a, 80b are pivotally linked to the pliers jaws 3, 4 in the region of a joint 97a, 97b, where the pivot axis of the joint 97a, 97b has an orientation vertical to the plane of illustration according to FIG. 13 and to the pivot plane 9 of the pliers jaws 3, 4. On the lids 80a, 80b, accessories such as the cutting elements 10, 11, the clamping jaws 20, 21 and/or knives 51, 52 are detachably held, as this has been described for the storage unit 19 located in the region of the hand lever 18. Preferably these accessories are held on the lid 80a, 80b by a dovetail joint 87a, 87b. For this purpose the lids 80a, 80b may have mounting grooves 84 having undercuts, the longitudinal axes of which define a mounting axis 88, which has an orientation vertical to the pivot plane 9 of the pliers jaws 3, 4. It is understood that of the two storage units 19a, 19b only one storage unit may be provided on a pliers head.

For the embodiment shown, the recess 96a of the storage unit 19a is located between the front end portion of the pliers jaw 3 (on which the clamping jaw 21 is held) and the joint 24. At least partly, the recess 96a extends laterally with respect to the cable stripping jaw 7 which is guided slidably with respect to the pliers jaw 3. Preferably a wall not shown in FIG. 13 on the one hand provides the bottom of the recess 96a. On the other hand this wall provides a sliding surface for a sliding guidance of the cable stripping jaw 7 with respect to the pliers jaw 3. Contrary to that, the storage unit 19b is placed approximately in the region of the joint 12, that is, to the side of the latter.

Figure 14:
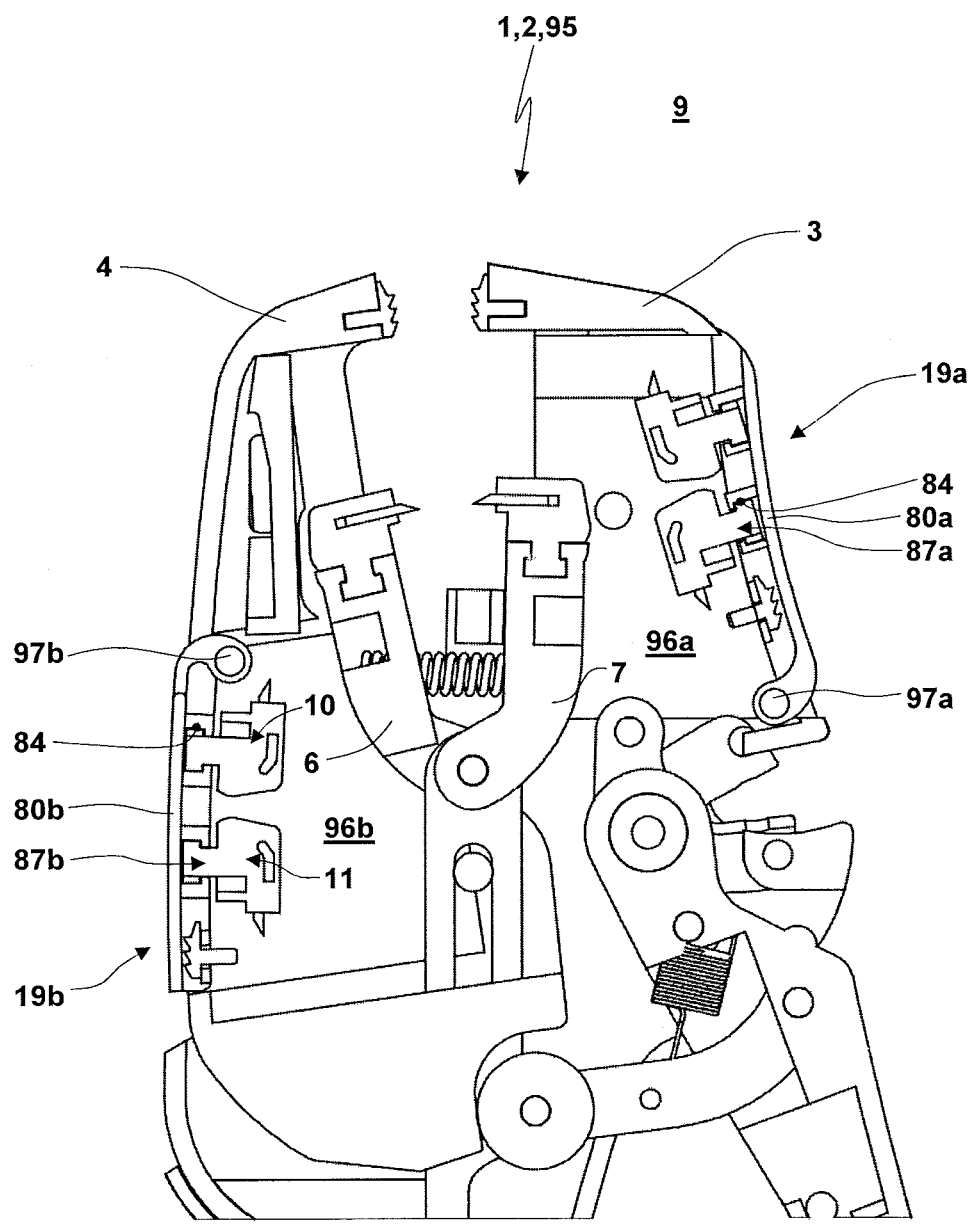
FIG. 14 shows the pliers head according to FIG. 13, with the storage units shown in a closed position here.

The lids 80a, 80b may in their closed position according to FIG. 14 be locked, latched or secured otherwise on the pliers jaws 3, 4, without this being shown in detail in the FIGS. 13 and 14. It is also possible that
the lids 80a, 80b are not pivotally mounted on the pliers jaws 3, 4 but are detachable,
the accessories are not held on the lid, but on the pliers jaws 3, 4 in the interior chambers 96a, 96b and/or
the lids 80a, 80 are pivotable in another direction (for example around a pivot axis, which lies in the plane of projection according to FIGS. 13 and 14) or are detachable or mountable in another direction.

The storage units 19, 19a, 19b are each formed in a pliers part 98, where this is preferably realized as a hand lever 18, a pliers jaw 3, 4 or a pliers head 95. The storage unit 19 serves for storing at least one accessory part 99 or different accessories parts, which may be for example a cutting element 10, 11, a clamping jaw 20, 21, a knife 51, 52 and/or a crimping die for crimping pliers.

Many variations and modifications may be made to the preferred embodiments of the invention without departing substantially from the spirit and principles of the invention. All such modifications and variations are intended to be included herein within the scope of the present invention, as defined by the following claims.

I claim:

1. Pliers comprising:
   a) hand levers (17, 18),
   b) pliers jaws (3,4),
   c) a gear connection between the hand levers (17, 18) and pliers jaw and
   d) a pliers part (98) comprising a storage unit (19) for storing at least one accessory part (99), wherein
   the pliers part (98) comprises a base body (73) and a lid (80),
   the base body (73) comprises an open cross-section which is at least partially closable by the lid (80),
   in the at least partially closed position of the lid (80), an inner chamber (79) is limited by the lid (80) and the open cross section of the base body (73),
   the accessory part (99) is located in the inner chamber (79),
   the accessory part (99) is an exchangeable cutting element (10, 11), clamping element (20, 21), or crimping element,
   a holding mechanism is used for holding the accessory part (99) by a form lock both in the inner chamber (79) for storage at the pliers part (98) as well as in an operating state of the accessory part (99) at the pliers jaws (3,4),
   the form lock comprising a dovetail joint,
   the accessory part (99) is held at the pliers part (98) by the dovetail joint (87),
   the base body (73) or lid (80) forms a mounting groove (88) or a mounting element of the dovetail joint (87), and
   the mounting of the dovetail joint (87) between the accessory part (99) and the lid (80) or the base body (73) is performed along a mounting axis (88) which has an orientation vertical to a pivot plane (9) wherein one of the hand levers (18, 19) or the hand levers (18, 19) and/or the pliers jaws (3, 4) are pivoted.

2. The pliers of claim 1, wherein the pliers part (98) is a pliers head (95) or one of said pliers jaws (3, 4).

3. The pliers of claim 1, wherein the pliers part (98) is a hand lever (18).

4. The pliers of one of claims 1 to 3, wherein the accessory part (99) is held at the lid (80).

5. The pliers of claim 4, wherein the lid (80) is detachable.

6. The pliers of claim 4, wherein the lid (80) is pivotably supported at the base body (73) of the pliers part (98).

7. The pliers of claim 6, wherein in a closed position the lid (80) is latched or locked at the base body (73).

8. The pliers of claim 6, wherein the lid (80) is located on the side of the base body (73) facing towards the other hand lever (17).

9. The pliers of claim 8, wherein in an open position of the lid (80) the accessory part (99) is assembled with or disassembled from the hand lever (18) along a mounting axis (88) having an orientation transverse to a longitudinal axis of the hand lever (18).

10. The pliers of claim 9, wherein in its end region facing towards the pliers head (95) the lid (80) is pivotably supported at the base body (73).

11. The pliers of claim 4, wherein in a closed position the lid (80) is latched or locked at the base body (73).

12. The pliers of claim 4, wherein the lid (80) is located on the side of the base body (73) facing towards the other hand lever (17).

13. The pliers of claim 12, wherein in an open position of the lid (80) the accessory part (99) is assembled with or disassembled from the hand lever (18) along a mounting axis (88) having an orientation transverse to a longitudinal axis of the hand lever (18).

14. The pliers of claim 3, wherein the lid (80) is located on the side of the base body (73) facing towards the other hand lever (17).

15. The pliers of claim 14, wherein in an open position of the lid (80) the accessory part (99) is assembled with or disassembled from the hand lever (18) along a mounting axis (88) having an orientation transverse to a longitudinal axis of the hand lever (18).

16. The pliers of claim 1, wherein the lid (80) is pivotably supported at the base body (73) of the pliers part (98).

17. The pliers of claim 1, wherein in a closed position the lid (80) is latched or locked at the base body (73).

18. The pliers of claim 1, wherein
a) the accessory part (99) is held at the lid (80),
b) the accessory part (99) comprises the mounting element (60, 61) of the dovetail joint (87),
c) the lid (80) comprises the mounting groove (84) of the dovetail joint (87),
d) in a closed position of the lid (80) an exit of the mounting element (60, 61) of the accessory part (99) from the mounting groove (84) of the lid (80) is blocked by an inner wall of the base body (73) which limits the inner chamber (79).

19. The pliers (1) of one of claims 1 to 3, wherein
a) a stripping unit (5) is provided,
   aa) wherein during a cutting stroke by a drive (16) an operating state of the stripping unit (5) is changed in a pivot plane (9) and
   ab) wherein during a cutting stroke by the drive (16) the stripping unit (5) is moved along a stripping axis (15),
   ac) wherein the accessory part (99) is a cutting element (10, 11) and the cutting element is exchangeably assembled with the stripping unit (5),
b) the cutting element (10, 11) is assembled with the stripping unit (5) by use of a mounting groove (56, 57), where a mounting element (60, 61) is slid into the mounting groove (56, 57) under the build-up of a positive lock such that between the cutting element (10, 11) and the stripping unit (5) a dovetail joint (86) is established,
c) the base body (73) or the lid (80) of the pliers part (98) comprises a mounting element or a mounting groove having corresponding designs and
d) under use of its mounting element (60, 61) or its mounting groove the cutting element (10, 11) is held in the inner chamber (79) of the pliers part (98) under the build-up of a dovetail joint (87) with the mounting element or mounting groove of the lid (80) or the base body (73).

* * * * *